United States Patent [19]
Gilliam

[11] Patent Number: 5,108,343
[45] Date of Patent: Apr. 28, 1992

[54] SEAFOOD DRESSING TOOL

[76] Inventor: Maxie Gilliam, P.O. Box 2438, Pearland, Tex. 77588

[21] Appl. No.: 521,601

[22] Filed: May 10, 1990

[51] Int. Cl.[5] .............................................. A22C 29/02
[52] U.S. Cl. ............................................ 452/6; 452/5; 30/254; 30/173
[58] Field of Search ................ 452/6, 3, 4; 30/173, 30/194, 244, 254

[56] References Cited

U.S. PATENT DOCUMENTS

| | | | |
|---|---|---|---|
| 2,647,278 | 8/1953 | Weinberger | 452/3 |
| 2,713,719 | 7/1955 | Coplen | 30/254 |
| 2,832,987 | 5/1958 | Di Camillo | 452/3 |

*Primary Examiner*—Willis Little

[57] ABSTRACT

A seafood dressing tool includes a pair of pivotally interconnected lever members, the lever members forming a pair of grips or handles on one of their ends and a pair of curved, slender blades on their other ends. One lever member forms the lower grip or handle and the upper blade, and the other or second lever member forms the upper grip or handle and the lower blade. The blades curve downwardly with respect to the longitudinal centerline of the tool when oriented for normal use. The lower blade has a relatively sharp upper knife edge, and the upper blade has a lower edge cooperable with the upper knife edge of the lower blade for effecting scissors-like cutting action when the handles or grips are squeezed closed toward one another. The lower blade is adapted for insertion longitudinally into the body of a headless shrimp at its proximal end when the blades are in an open position, with the upper blade then being superposed along the shrimp's back. The lower blade is inserted into the shrimp until it nearly reaches, but stops short of, the shrimp's tail. When the blades are closed, the blade action is adapted for snipping the body and shell of the shrimp transversely from the shrimp's back to its midportion along its length, again stopping short of the tail.

7 Claims, 3 Drawing Sheets

SEAFOOD DRESSING TOOL

BACKGROUND OF THE INVENTION

The present invention relates generally to seafood dressing apparatus, and more particularly to a hand-held seafood dressing tool which is especially adapted to cleave a headless shrimp to permit the easy removal of its shell, legs, and "vein." The tool of the present invention may also be used to trim or dress other types of seafood, for example, lobster, crab, catfish, or the like.

One of the most versatile, delectable, and widely enjoyed seafoods is the shrimp. Boiled shrimp, whether heaped on a platter or delicately arranged in a cocktail, served with appropriate condiments such as drawn butter or tangy cocktail sauces, delight millions. Millions more savor the flavor of sautéed, batter-dipped, stir-fried, or tempura style shrimp. Add to this the seemingly endless variety of shrimp dishes and regional accents, from curries to etoufées to gumbos, from Far East to Gulf Coast, and one can well appreciate the enormous popularity of this tiny crustacean.

The popularity of the shrimp has reached all-time highs of late in spite of the relative difficulty encountered in its preparation. Such preparation typically requires the shrimp to be dressed or cleaned first, which usually entails deheading the shrimp, peeling off the shell and legs, and removing the longitudinally extending intestine or "vein." This dressing procedure can be very time-consuming, especially when done by hand, as is typically required when fresh shrimp are prepared at home or in small-scale commercial environments. Large-scale commercial enterprises usually have at their disposal automatic, high-speed, high-volume deheading, cleaning, and sorting equipment which eliminates most of the manual labor from shrimp dressing operations. Such commercial equipment is too large, complicated, and expensive for use by home shrimp consumers and many small businesses, however, so such persons who wish or need to dress their own shrimp must resort to manual techniques.

One technique for manually dressing a shrimp involves inserting a slender knife blade or other similar implement into the proximal end of the shrimp's body, i.e., the end opposite the tail, after the head has been removed and slicing the body transversely from its midportion through its back and shell. The shell and legs are then peeled away, and the shrimp's body is separated longitudinally along the slice, which exposes the vein. The vein is then grasped and pulled out.

A significant problem with the foregoing manual dressing procedure is that the slicing operation can be very dangerous. The shrimp are typically wet and slippery when dressed, often leading to mishandling of the shrimp or slicing implement during the slicing step and sometimes resulting in injury to the operator. The potential for injury increases as the operator tries to speed up operations, as is sometimes called for, and uses less care and caution than he would otherwise exercise. Although special manual shrimp dressing tools have been proposed in the past as alternatives to a paring knife or the like, they suffer from the same drawback. Such tools typically require the operator to slice the shrimp with a relatively sharp blade, a motion which carries with it the possibility of mishandling the shrimp, the blade, or both, and thereby exposing the operator to injury.

It is an object of the present invention to provide a shrimp dressing tool which overcomes the problems of prior art manual shrimp dressing tools and techniques referred to above by providing a manual shrimp dressing tool which does not require the shrimp to be cut with a slicing motion, but rather enables the shrimp to be snipped open with a scissor-like operation. It is another object of the present invention to provide a shrimp dressing tool which replaces the slicing step of the manual technique referred to above with a safe, efficient snipping step which virtually eliminates the possibility of injury in manually dressing shrimp.

It is another object of the present invention to provide such a shrimp dressing tool which is fast and easy to use, durable, and reliable. It is yet another object of the present invention to provide a shrimp dressing tool which is simple and inexpensive to manufacture.

SUMMARY OF THE INVENTION

The shrimp dressing tool of the present invention comprises a pair of pivotally interconnected lever members, the lever members forming a pair of grips or handles on one of their ends and a pair of curved, slender blades on their other ends. One lever member forms the lower grip or handle and the upper blade, and the other or second lever member forms the upper grip or handle and the lower blade. The blades curve downwardly with respect to the longitudinal centerline of the tool when oriented for normal use. The lower blade has a relatively sharp upper knife edge, and the upper blade has a lower edge cooperable with the upper knife edge of the lower blade for effecting scissors-like cutting action when the handles or grips are squeezed closed toward one another.

The lower blade is adapted for insertion longitudinally into the body of a headless shrimp at its proximal end when the blades are in an open position, i.e., when the handles or grips are separated from one another, with the upper blade then being superposed along the shrimp's back. The lower blade is inserted into the shrimp until it nearly reaches, but stops short of, the shrimp's tail. When the blades are closed, i.e., when the grips are squeezed toward one another, the blade action is adapted for snipping the body and shell of the shrimp transversely from the shrimp's back to its midportion along its length, again stopping short of the tail. The shell and legs of the shrimp can then be removed as in prior art manual dressing techniques, and the shrimp's body separated for removal of the vein, again as in conventional manual shrimp dressing techniques. With the present invention, however, the slicing action of the prior art is replaced with a safe, effective, efficient snipping action.

The lever members of the present invention are spring biased into the blade-open position, ready for use; that is, the tool is biased so that the lower blade may readily be inserted into a shrimp. The second lever member has an upwardly extending safety stop or slip guard disposed thereon between the upper handle and the lower blade to prevent the operator's hand from slipping along the handles into contact with the blades. The upper surface of the first lever member and the lower surface of the second lever member have inwardly extending travel stops disposed between the handles and blades to prevent the handles from being squeezed together too closely during the snipping operation. This provides a positive travel stop for the blades when fully closed and prevents the operator's hand or fingers from being pinched between the handles. The grips may each be provided with a rubber or plastic foam coating or sleeve, tape, or other friction means for creating an anti-slip surface for gripping by the operator.

BRIEF DESCRIPTION OF THE DRAWINGS

These and other advantages of the present invention will be apparent from the following detailed description, taking into account the foregoing discussion, and read in conjunction with reference to the following drawings wherein.

DETAILED DESCRIPTION OF THE PREFERRED EMBODIMENT

Figure 1:
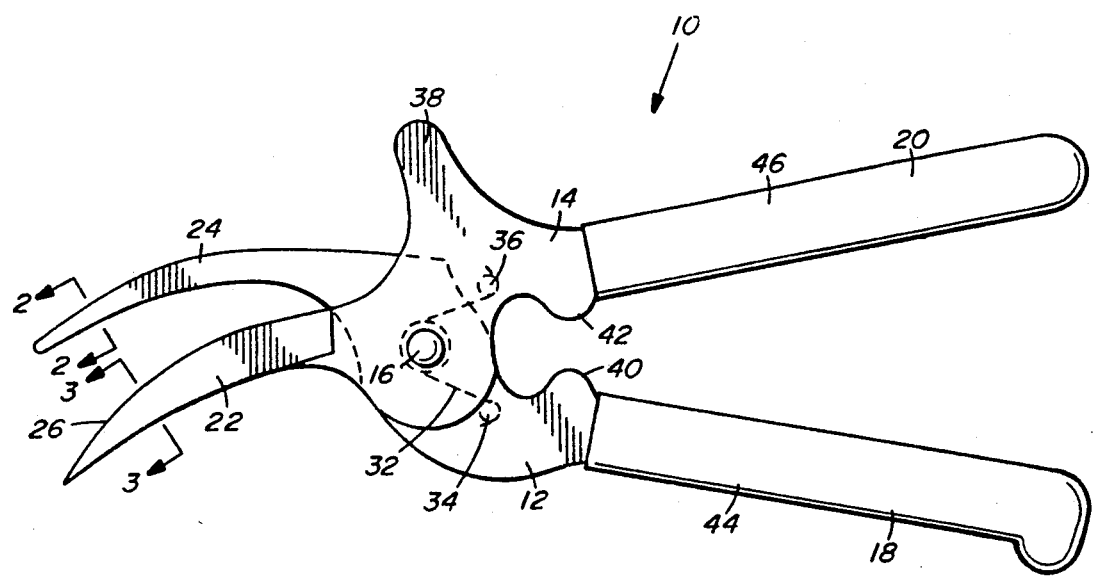
FIG. 1 is an elevational view of the seafood dressing tool of the present invention.
Figure 2:
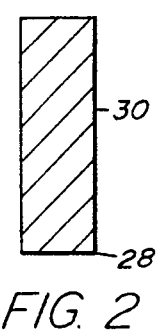
FIG. 2 is a cross-sectional view of the upper blade of the tool of FIG. 1, taken along lines 2—2 of FIG. 1.
Figure 3:
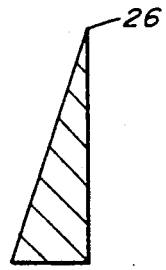
FIG. 3 is a cross-sectional view of the lower blade of the tool of FIG. 1, taken along lines 3—3 of FIG. 1.

Referring initially to FIGS. 1, 2, and 3, the seafood dressing tool of the present invention is indicated generally at 10 and includes a first lever member 12, a second lever member 14, and a stud or pin 16 for pivotally interconnecting lever members 12, 14. Pin 16 locks the lever members 12, 14 together and permits them to rotate with respect to the axis of the pin. The lever members 12, 14 form a pair of grips or handles 18, 20, respectively, on one of their ends and a pair of curved, slender blades 24, 22, respectively, on their other ends. Lever member 12 forms the lower grip or handle 18 and the upper blade 24, and lever member 14 forms the upper grip or handle 20 and the lower blade 22.

Figure 4:
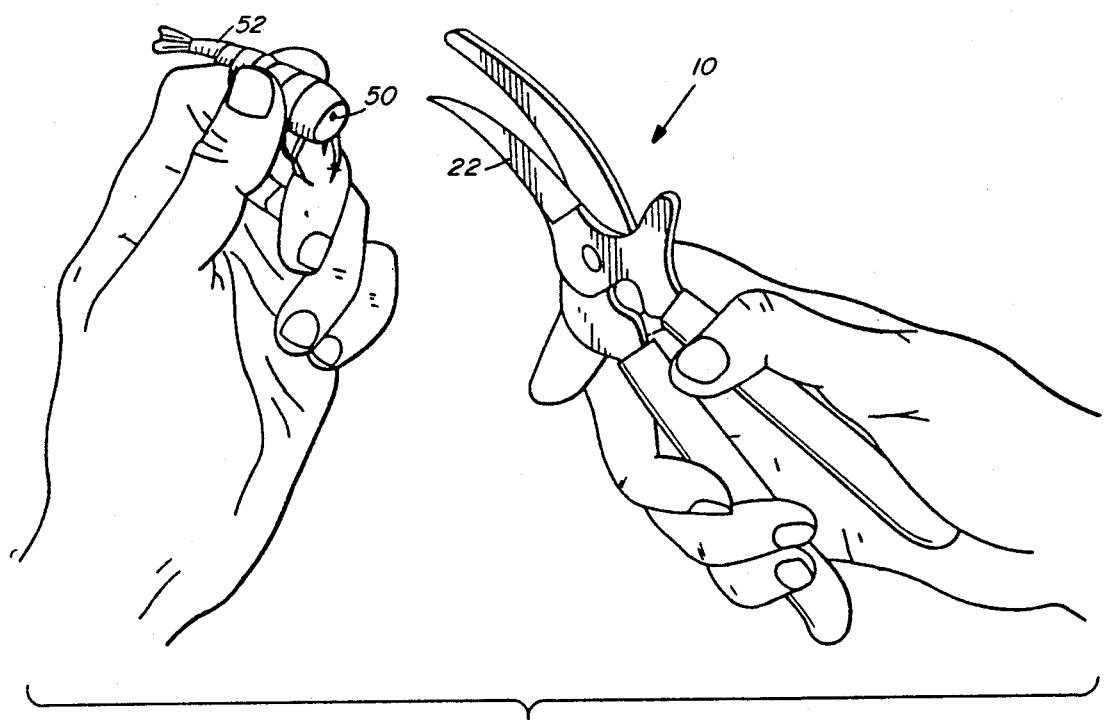
FIG. 4 is a pictorial view of the tool of FIG. 1 held in one hand of an operator, with the other hand of the operator holding a headless shrimp to be dressed.
Figure 5:
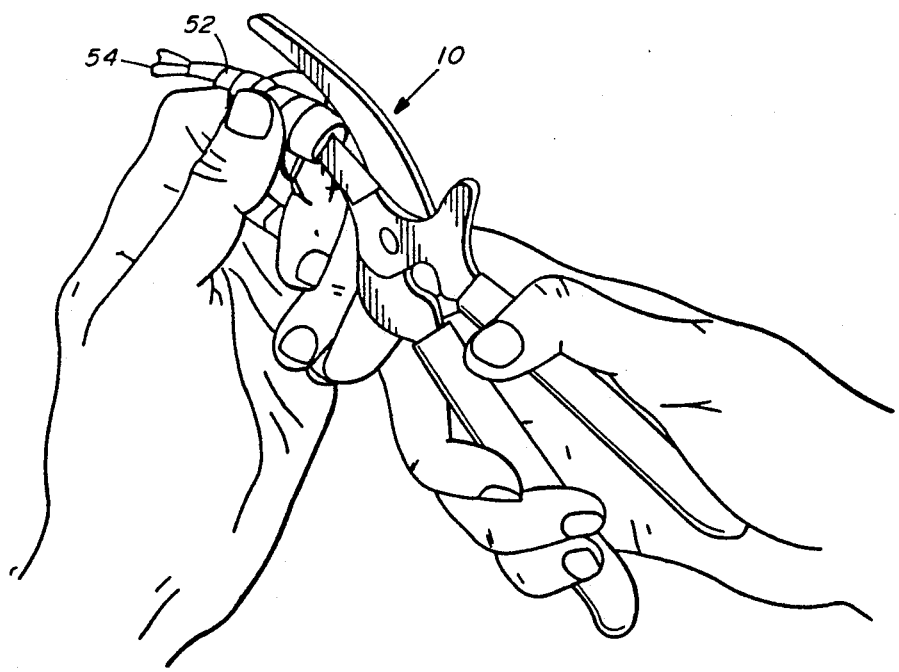
FIG. 5 is a pictorial view of the tool, shrimp, and operator's hands of FIG. 4, with the lower blade of the tool inserted into the shrimp's body, prior to snipping the shrimp open.
Figure 6:
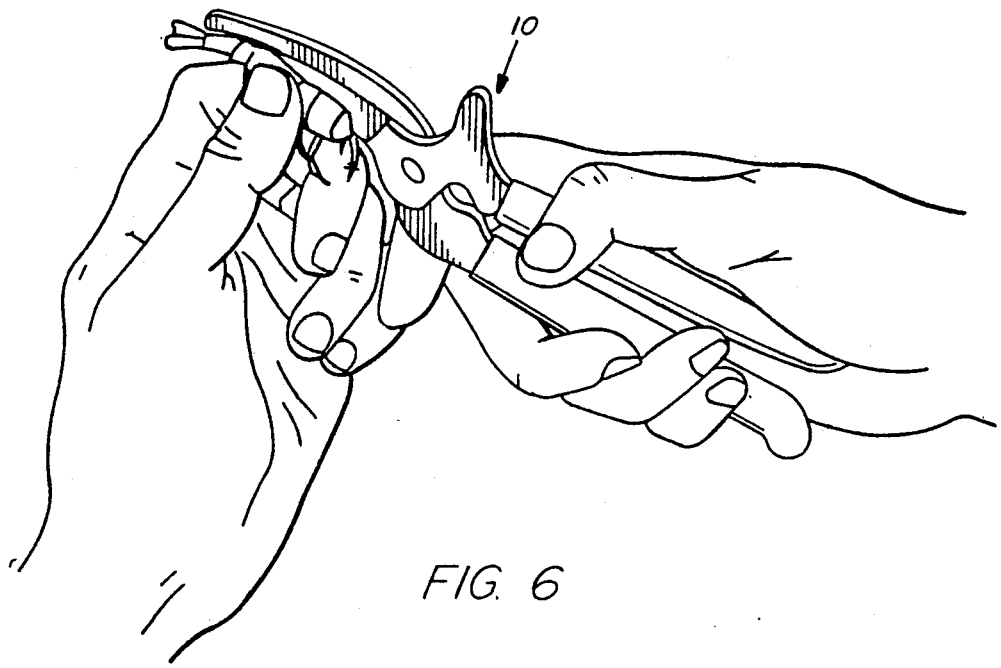
FIG. 6 is a pictorial view of the tool, shrimp, and operator's hands of FIGS. 4 and 5, after snipping the shrimp but prior to removal of the tool from the shrimp's body.

The blades 22, 24 curve downwardly with respect to the longitudinal centerline of the tool when oriented for normal use, as shown in FIGS. 4-6. The curvature of the blades conforms generally to the shape of the body of a shrimp and facilitates insertion of the lower blade 22 into the body as shown and described herein. The lower blade 22 has a relatively sharp upper knife edge 26, shown best in FIG. 3, and the upper blade has a lower edge 28 and inside surface 30 cooperable with the upper knife edge 26 of the lower blade 22 for effecting scissors-like cutting action when the handles or grips 18, 20 are squeezed closed toward one another. The upper blade has a generally rectangular cross-section as shown in FIG. 2, and the lower blade has a generally triangular cross-section as shown in FIG. 3. Blades 22, 24 are relatively long and slender, with the upper blade being the more slender of the two. The blades have substantially the same degree of downward curvature.

Figure 7:
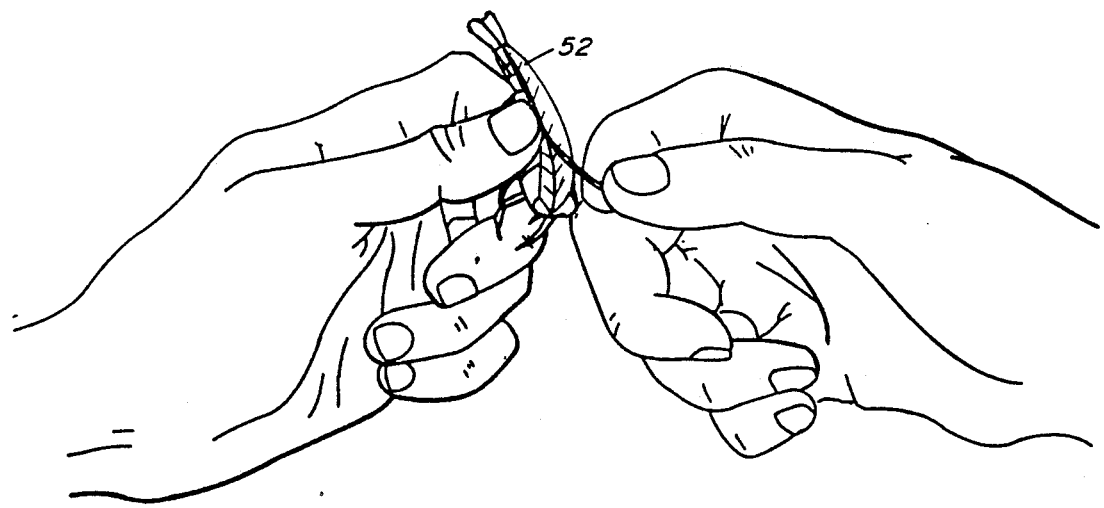
FIG. 7 is a pictorial view of the shrimp and operator's hands of FIGS. 4-6, with the shrimp snipped open and after removal of the tool from the shrimp's body, and with the operator grasping and removing the vein.

The lower blade 22 is adapted for insertion longitudinally into the body of a headless shrimp at its proximal end when the blades 22, 24 are in an open position, i.e., when the handles or grips 18, 20 are separated from one another, with the upper blade 24 then being superposed along the shrimp's back. This configuration is shown in FIG. 5. The lower blade is inserted into the shrimp until it nearly reaches, but stops short of, the shrimp's tail. When the blades are closed, i.e.. when the grips are squeezed toward one another, the blades 22, 24 snip the body and shell of the shrimp transversely from the shrimp's back to its midportion along its length, again stopping short of the tail. This is accomplished without damaging the meat of the shrimp. This snipping operation is shown in FIG. 6. The shell and legs of the shrimp can then be removed as in prior art manual dressing techniques, and the shrimp's body separated for removal of the vein, again as in conventional manual shrimp dressing techniques, and as shown in FIG. 7. With the present invention, it will be appreciated that the slicing action of the prior art is replaced with a safe, effective, efficient snipping action.

The lever members of the present invention are biased by a spring 32 disposed around pivot pin 16 and anchored onto lever members 12, 14 at retaining pins 34, 36, respectively. The lever members are biased into the blade-open position, ready for use; that is, the tool is biased so that the lower blade 22 may readily be inserted into a shrimp. Lever member 20 has an upwardly extending safety stop or slip guard 38 disposed thereon between the upper handle 20 and the lower blade 22 to prevent the operator's hand from slipping along the handles 18, 20 into contact with the blades 22, 24. The upper surface of the first lever member 12 and the lower surface of the second lever member 14 have inwardly extending travel stops 40, 42, respectively, disposed between the handles and blades to prevent the handles from being squeezed together too closely during the snipping operation. This provides a positive travel stop for the blades when fully closed and prevents the operator's hand or fingers from being pinched between the handles. The grips may each be provided with a rubber or plastic foam coating or sleeve, tape, or other friction means 44, 46 for creating an anti-slip surface for gripping by the operator.

The seafood dressing tool of the present invention may be made of metal or suitable plastics, although it is preferred that at least the blades be made of metal. A metal such as stainless steel would be particularly suitable for the present invention. This would help prevent corrosion of the blades, pivot pin, and spring, and would help assure proper operation of the tool over time.

Figure 8:
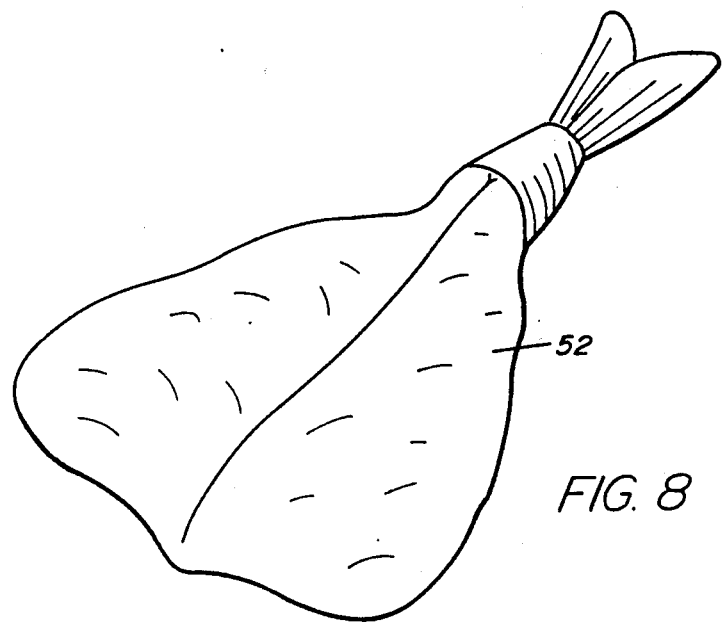
FIG. 8 is a pictorial view of the shrimp of FIGS. 4-7, after the dressing operations have been completed.

Use of the seafood dressing tool of the present invention for dressing a shrimp is shown in FIGS. 4-6. FIG. 4 shows the operator holding a headless shrimp in one hand, and the tool of the present invention in the other. The operator is about to insert blade 22 into the proximal end 50 of shrimp 52. Tool 10 is held with the blades curving downwardly, and shrimp 52 is held with the back uppermost. As shown next in FIG. 5, the blade 22 is inserted into the shrimp's body from proximal end 50, and is stopped short of the tail 54. Blades 22, 24 are then closed as shown next in FIG. 6, snipping the shrimp open. The blade 22 is then removed from the shrimp and the tool 10 set aside (not shown). The shrimp is then split open along the cut made in FIG. 6, and the vein may be removed as shown in FIG. 7. The shell and legs are also removed. The fully dressed shrimp is shown in FIG. 8.

Thus, it will be appreciated that the tool 10 of the present invention provides a safe, efficient, and simple means for facilitating the manual dressing of shrimp. The seafood dressing tool of the present invention can also be used to trim or dress other types of seafood, or other foods in general. For example, the tool of the present invention may be used to snip crab legs or lobster tails, trim catfish spines, or snip turkey or chicken wings. In addition, the present tool may be used to snip the heads off the shrimp. Many other uses will no doubt occur to one skilled in the art. While preferred embodiments of the invention have been shown and described, many modifications thereof may be made by those skilled in the art without departing from the spirit of the invention. Accordingly, the scope of the invention should be determined in accordance with the following claims.

I claim:

1. A seafood dressing tool, comprising:
a pair of pivotally interconnected lever members, the lever members forming a pair of handles on one of their ends and a pair of curved blades on their other ends, said handles being adapted for opening or closing said blades when said handles are moved apart from or toward one another, respectively, one of said lever members forming a lower handle on one end and an upper blade on its other end, the other of said lever members forming an upper handle on one end and a lower blade on its other end, said lower blade having a generally triangular cross-section and said upper blade having a generally rectangular cross-section, said upper blade having a blunt free end, said blades curving downwardly with respect to the longitudinal centerline of said tool when oriented for normal use to conform generally to the shape of the body of a headless shrimp, said lower blade being adapted for longitudinal insertion into the proximal end of said body of said shrimp when said blades are in an open position and said upper blade being adapted for superposition over the back of said body of said shrimp when said lower blade is disposed in said body of said shrimp;
said blades having a pair of cooperating edges adapted for snipping said body of said shrimp transversely from its back to its midportion when said blades are closed into cooperating engagement with one another, the lower rectangular face of said upper blade fitting closely to and substantially all along said back of said body of said shrimp when said blades are so closed into cooperating engagement.

2. A seafood dressing tool according to claim 1, wherein said blades are relatively long and slender.

3. A seafood dressing tool according to claim 2, wherein said upper blade is more slender than said lower blade.

4. A seafood dressing tool according to claim 1, wherein said blades are biased into the open position.

5. A seafood dressing tool according to claim 1, wherein said other lever member has an upwardly extending slip guard member disposed on its upper surface between said upper handle and said lower blade.

6. A seafood dressing tool according to claim 1, wherein said lever members have inwardly extending, interengageable travel stops on their opposing surfaces between the handles and blades for preventing the handles from being moved together further when the blades are fully closed.

7. A seafood dressing tool according to claim 1, wherein said handles are provided with friction means disposed thereon for preventing an operator's hand or fingers from slipping along said handles toward said blades.

* * * * *